United States Patent [19]

Burgess

[11] Patent Number: 4,791,592

[45] Date of Patent: Dec. 13, 1988

[54] METHOD AND APPARATUS FOR REDUCING JITTER IN A DIGITIZER OR OTHER TRANSDUCER

[75] Inventor: Ken L. Burgess, Ft. Collins, Colo.

[73] Assignee: Hewlett-Packard Company, Palo Alto, Calif.

[21] Appl. No.: 857,892

[22] Filed: Apr. 30, 1986

[51] Int. Cl.⁴ .............................................. G05B 13/04
[52] U.S. Cl. .............................. 364/572; 364/724.01; 375/118
[58] Field of Search ............... 364/572, 724, 520, 157, 364/162; 375/118

[56] References Cited

U.S. PATENT DOCUMENTS

| 4,184,129 | 1/1980 | Macchi nee Danjon et al. | 364/724 |
| 4,255,617 | 3/1981 | Carau, Sr. et al. | 178/19 |
| 4,514,855 | 4/1985 | Lang et al. | 375/118 |
| 4,556,956 | 12/1985 | Dickenson et al. | 364/162 |

OTHER PUBLICATIONS

Selected Portions of an Operating Manual for HP Model 9107A Calculator Digitizer, HP Part Number 09107-90000, Apr., 1971, pp. 54-56, 61 & 62 out of total pp. 54-77.

Primary Examiner—Parshotam S. Lall
Assistant Examiner—V. N. Trans
Attorney, Agent, or Firm—Edward L. Miller

[57] ABSTRACT

A method of digitially filtering unfiltered values from a transducer to eliminate jitter compares a new unfiltered value against the previous filtered value. If the difference exceeds a selected amount the unfiltered amount is taken as and replaces the filtered value. If the difference is less than the selected amount then the new filtered amount is calculated from sliding percentages of the old filtered value added to the new unfiltered value. The two percentages add to one hundred percent, and linearly reflect what percentage the difference is of the selected amount.

3 Claims, 1 Drawing Sheet

METHOD AND APPARATUS FOR REDUCING JITTER IN A DIGITIZER OR OTHER TRANSDUCER

REFERENCE TO RELATED APPLICATION

The subject matter of the present application is related to that which is disclosed in U.S. Pat. No. 4,686,331 issued Aug. 11, 1987 and entitled DIGITIZING METHOD AND APPARATUS FOR COMPENSATING CURSOR OR STYLUS VELOCITY ERRORS, filed on Apr. 23, 1986 by Ken L. Burgess, and assigned to the same assignee as is the present application. The afore-mentioned application is hereby incorporated by reference, and hereinafter will be referred to simply as "Burgess".

BACKGROUND AND SUMMARY OF THE INVENTION

High resolution digitizers commonly incorporate some sort of filtering to reduce jitter in their output coordinates. Depending upon the nature of the digitizing technique, this may take the form of analog filtering upon signals proportional to the measured coordinates, or digital filtering through the application of numerical methods. The latter type of filtering is especially attractive in a digitizer controlled by a microprocessor. Simple averaging of consecutive measurements is one known method of digital filtering. See, for example, U.S. Pat. No. 4,255,617 issued on Mar. 10, 1981 to Carau, et al.

The reduction of jitter is especially important to a digitizer intended to operate in a polled environment of the following sort. A controller polls devices connected "in series" in an interface "loop". By design, if the device has no new data to report to the controller, it so indicates, and the controller proceeds to poll the next device. This type of operation conserves bandwidth on the loop. However, if the device is a digitizer with jitter, then new coordinates could be reported each time that digitizer were polled, even though the stylus or cursor were held completely stationary! Such a mode of operation would unnecessarily consume the valuable information bandwidth of the loop. It would be desirable to filter the output of such a digitizer to suppress the effects of jitter. What is desired is a digitizer that does not output coordinates unless there has been an actual change in the position of the cursor or stylus. Commercial examples of such digitizers operating with an interface loop of the type described are the Hewlett-Packard model 46087A and model 46088A Digitizing Tablets. These digitizers operate with what is called the HP-HIL, or Hewlett-Packard Human Interface Loop.

Known methods of filtering interfere with a property that may be termed "dynamic accuracy". Dynamic accuracy is the ability of the digitizer to output coordinate values that lie upon the actual path taken by the cursor or stylus, even though the cursor or stylus is moving, perhaps rapidly, and not output coordinates that do not lie upon that path. See the above-mentioned disclosures by Carau and Burgess for descriptions of what can happen when the cursor or stylus is in motion during the process of digitizing. It should be understood that filtering to reduce jitter can aggravate the problem of maintaining good dynamic accuracy. It would be desirable to find a filtering technique to eliminate jitter without sacrificing good dynamic accuracy.

It will also become clear that the technique to be described for the reduction or elimination of jitter is applicable to other types of transducers besides digitizing tablets; e.g., angle transducers. Although it produces only a single "coordinate" and not a pair, the output of an angle transducer is subject to jitter and may include a dynamic accuracy specification. (Rather than requiring that a point lie upon a line, a dynamic accuracy specification for an angle transducer would require a correct correspondence between reported angles and points in time.) The inventive technique may be applied to any stream of coordinates whose values increase or decrease monotonically as a steadily increasing or decreasing input is applied to the transducer.

DESCRIPTION OF A PREFERRED EMBODIMENT

Figure 1:
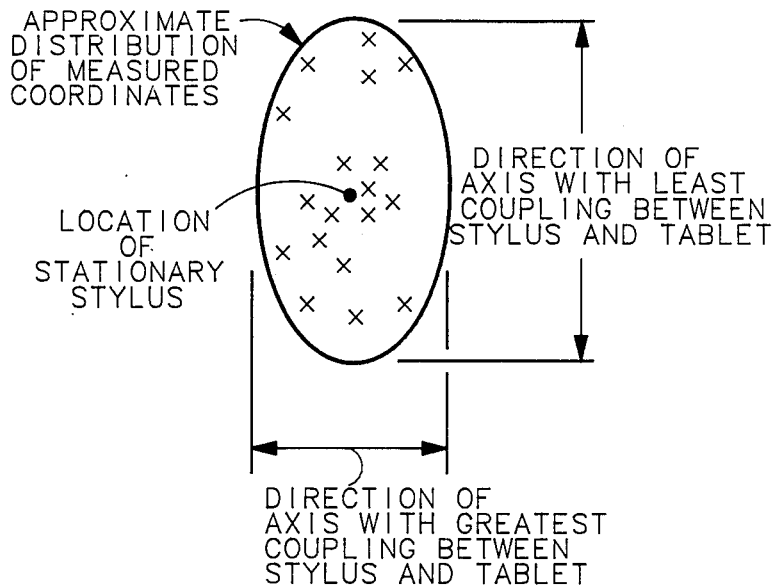
FIG. 1 is an illustration of the effects of jitter upon the measurements performed by a digitizer, even though the cursor or stylus is held in a fixed location upon the digitizing surface.

The effect of jitter upon output coordinates of a digitizer is illustrated in FIG. 1. According to the figure a generally elliptical region 1 surrounds a point 2. Point 2 is any arbitrary stationary location upon the digitizing surface where the tip of the stylus or the center of the cursor might happen to be. The small crosses inside the ellipse 1 indicate possible unfiltered coordinates that could be returned in place of the actual coordinates of the point 2, even though the cursor or stylus is indeed stationary.

Here is a more detailed interpretation of FIG. 1. Most digitizers that rely solely upon electro-magnetic principles for their digitizing technique "run all the time". That is, they continuously measure the coordinates of the stylus. This can assist in allowing faster response to a request from the operator or executing software for new coordinates. It will be understood that measuring all the time is not the same thing as reporting every measurement to the host processing means. Depending upon the digitizer, there may be anywhere from thirty to three hundred measurements per second. What FIG. 1 shows is a probability density relationship that describes a clustering of likely unfiltered measurement values about a fixed stylus position. It shows that the most likely coordinates to be produced are those closest to the actual position, and that less likely values are possible out to the boundaries of the ellipse 1. The boundary 1 is generally elliptical rather than circular, since there is generally not equal coupling between the stylus or cursor and the operative measurement mechanisms for the different axes imbedded in the digitizing surface. In the Carau digitizer, for example, there are two grids of parallel lines at different depths in the platen. In the digitizing tablet disclosed in Burgess there are several sets of sensing loops imbedded at different depths in the platen.

It has been found for the digitizer tablet disclosed in Brugess, for example, that the aspect ratio of the ellipse 1 is approximately 2:1, with the X axis being the direction with the greatest deviation (and corresponding to the major axis of the ellipse). That digitizing tablet resolves to one one-thousandth of an inch, and the dimensions of the ellipse are approximately eight thousandths of an inch by four thousandths of an inch (i.e., eight by four "counts"). Bear in mind that the ellipse is produced by unfiltered, or raw, coordinate data obtained at a relatively high measurement rate. (The internal raw coordinate pair measurement rate for the digitizer described in Burgess is two hundred and fifty points per second.)

It may also be of interest to point out that, while that coordinate data may be unfiltered data, it has been averaged in accordance with the various dynamic error reductions schemes disclosed in Burgess: i.e., the measurement sequences X, Y, X; X', X", X'; and Y', Y",.Y'. Such limited averaging, while very effective for the purpose of maintaining dynamic accuracy as described in Burgess, does not effectively reduce jitter, and is thus not useful as filtering. Accordingly, the filtering technique described herein has been used in conjunction with the above described limited averaging in the HP model 46087A and 46088A Digitizing Tablets. It should be pointed out that the filtering technique to be described herein does not require that the applied measurements be previously averaged as described in Burgess; the use of averaging is a matter of choice resting with the designer. It will be noted, however, that the technique of filtering described herein is compatible with prior averaging (or even subsequent averaging), and that the particular combination described above for the HP 46087A and HP 46088A is a particularly harmonious one.

Figure 2:
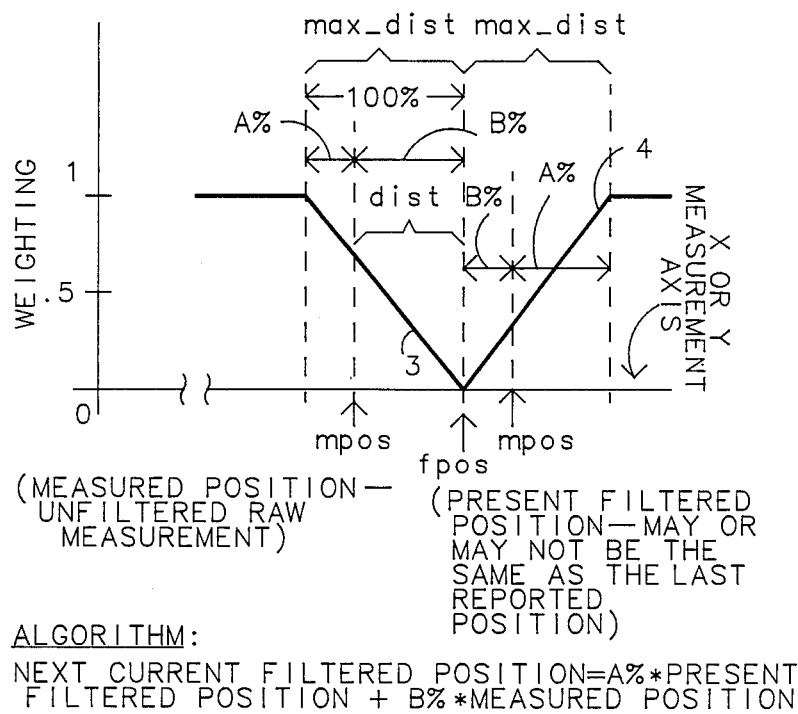
FIG. 2 is an illustration in support of an explanation of a novel technique for reducing jitter in the output of a digitizer or other transducer.

We turn now to FIG. 2, which forms the basis for explaining: (1) how filtering can be accomplished to shrink the ellipse 1 down to its limiting case of being simply the point 2 (eliminating jitter); and (2) doing so without impeding dynamic accuracy; thereby accomplishing the objectives of the invention. First, let it be noted that the technique to be described is applied separately to each measured coordinate part; i.e., to both the X and Y of an (X, Y) coordinate pair. Therefore, what we are about to describe is done twice for each digitized point.

A newly measured abscissa or newly measured ordinate is, in FIG. 2, termed simply mpos (measured position). An mpos may, but need not, be the result of the X', X", X' or Y', Y", Y' averaging mentioned above and described in Burgess. In any event, mpos is the next abscissa or ordinate in need of filtering. The value fpos is the result of the filtering process to date. There are actually two sets of mpos and fpos; one for ordinates and one for abscissas. In the interest of simplifying the notation and shortening the explantion, we shall not attempt to distinguish between the two sets. Just recall that what is done to abscissas is also done to ordinates.

The value max_dist is a value establishing an interval about both sides of fpos. If the (new) value of mpos lies outside that interval, then filtering is avoided in favor of simply taking mpos as the next fpos. That is, the new measured value is sufficiently far away from the previous one that mere jitter cannot explain the difference; it must be the case that rapid cursor or stylus motion has occurred. If that is the case, filtering is avoided altogether. This does not mean that filtering is suspended whenever there is any significant cursor or stylus motion detected; suspension of filtering occurs only when that motion is extreme. The value chosen for max_dist in the HP 46087/88A is sixty-four counts. That corresponds to a stylus motion parallel to one of the axes of approximately fourteen inches per second. For cases of less rapid motion (mpos is within the interval of max_dist about fpos) and for the case of mere jitter about a stationary position (there is really no convenient way to reliably tell the two cases apart, so they are treated as one case), filtering proceeds as follows.

First, the value dist, representing the absolute value of fpos minus mpos, will have previously been found. It is by comparing that value to max_dist that the decision can be made whether to simply take the next mpos as the new fpos, or whether to filter mpos as next described. If dist is less than max_dist, then the algorithm shown in FIG. 2 is applied. A% and B% represent percentages based on where the value of mpos lies in the interval from fpos to max_dist (in either direction). That is, if mpos is close to fpos, then B% is close to zero percent, and A% is close to one hundred percent. On the other hand, if mpos is close to fpos plus or minus max_dist, then A% is close to zero percent and B% is close to one hundred percent. Values inbetween are calculated according to a strict linear relationship, as indicated by the straight line segments 3 and 4 in FIG. 2.

When the value of dist is less than max_dist the new value of fpos is found by adding A% of the present (old) fpos to B% of the latest mpos.

This method of filtering allows the larger changes that result from actual cursor movement to contribute with increasing significance to changes in the reported coordinates. But in contrast, it also causes effective repeated averaging of smaller increments more likely to be mere jitter. This is because with high values of A% and low values of B%, fpos changes very little from one fltering cycle to the next, allowing the jitter to cancel its effect on changes to fpos. But on the other hand, actual small changes in cursor position will be correctly reported (although more slowly), since B% will not be zero. This means that after a sufficient number of filtering cycles the filtering will "catch up" to any actual changes in cursor position, provided that they are large enough to produce at least a one count change. This works well, since the sample rate (and hence the cycle rate for filtering) is relatively high. A person deliberately moving the cursor or stylus very slowly in small amounts will perceive no lag at all in the reported coordinates.

The following Pascal procedure illustrates the manner in which a microprocessor in a digitizer can be programmed to perform filtering according to FIG. 2 and the above explanation. All values are integers representing one count for each thousandth of an inch.

```
{ mpos = measured position }
{ fpos = filtered position }
procedure filter (var mpos, fpos: integer);
const max_dist = 64;
var dist: integer;
begin
  dist := abs(fpos-mpos);
  if dist < max_dist then fpos :=
    (fpos*(max_dist - dist) + (dist*mpos)) div max_dist;
  else fpos := mpos;
end;
```

The above section of code could, for example, be compiled and stored in a ROM from which it would be executed by a microprocessor, such as the microprocessor 33 shown in FIG. 4 of Burgess.

I claim:

1. A method of filtering jitter from measured transducer output values, the method comprising the steps of:

(a) transducing a physical phenomenon to produce an unfiltered output;
   (b) repeatedly measuring the unfiltered output to produce a sequence of unfiltered output values;
   (c) maintaining a previous filtered output value obtained in accordance with steps (e) and (f) recited below;
   (d) determining if the most recent unfiltered output value from step (b) lies within a preselected interval about the previous filtered output value maintained in step (c);
   (e) subsequent to step (d) and whenever the determination of step (d) is in the negative, discarding the previous filtered output value maintained in step (c) and substituting therefor the most recent unfiltered output value of step (b);
   (f) subsequent to step (d) and whenever the determination of step (d) is in the affirmative, replacing the previous filtered output value maintained in step (c) with a value equal to a first percentage of the most recent unfiltered value of step (b) added to a second percentage of the previous filtered value maintained in step (c), the first and second percentages summing to one hundred percent and the first percentage varying from zero percent to one hundred percent as the most recent unfiltered value of step (b) changes in value from the value of the previous filtered output value maintained in step (c) to the value of an endpoint of the selected interval of step (d); and
   (g) subsequent to steps (e) and (f), supplying the filtered value of step (c) as the measured transducer output value.

2. A method as in claim 1 wherein the transducer is a digitizer and the measured transducer output values are the abscissas and ordinates of measured cartesian coordinates.

3. A method as in claim 1 wherein the recited variation in the first percentage from zero percent to one hundred percent is a linear function of the most recent unfiltered value of step (b).

* * * * *